Oct. 30, 1951 G. F. LINCKS 2,573,459
PROTECTIVE ARRANGEMENT FOR ELECTRIC POWER DISTRIBUTION
Filed July 18, 1947
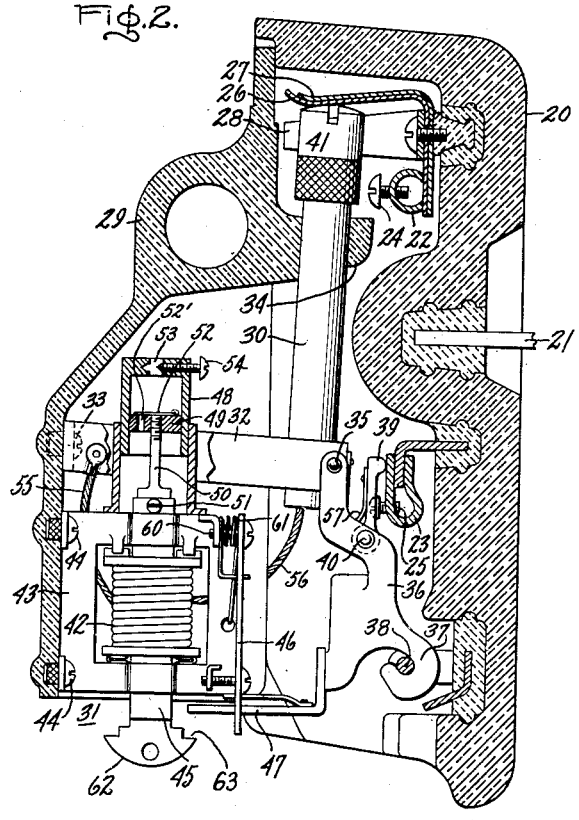
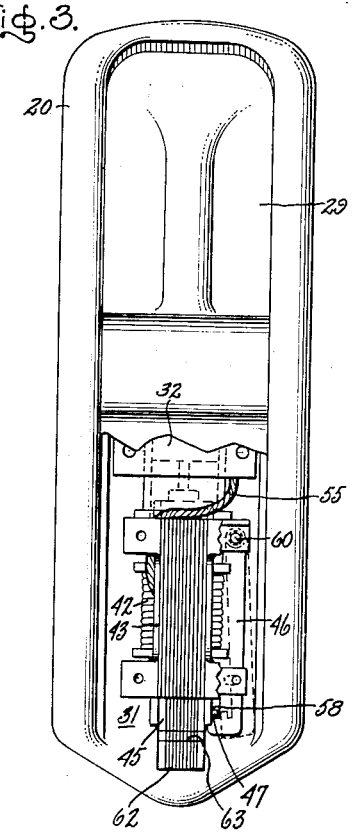
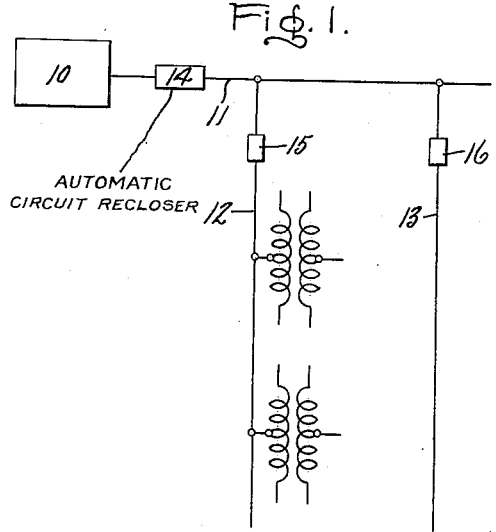
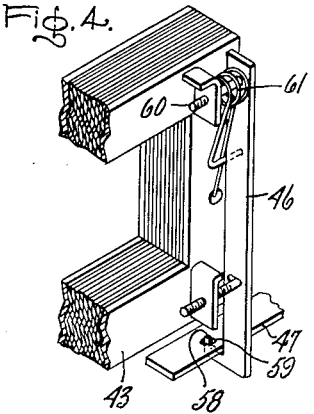
Inventor:
George F. Lincks,
by Ernest C. Britton
His Attorney.

Patented Oct. 30, 1951

2,573,459

UNITED STATES PATENT OFFICE 2,573,459

PROTECTIVE ARRANGEMENT FOR ELECTRIC POWER DISTRIBUTION

George F. Lincks, Pittsfield, Mass., assignor to General Electric Company, a corporation of New York Application July 18, 1947, Serial No. 761,894

7 Claims. (Cl. 175—294)

The present invention relates to a protective arrangement for electric power distribution systems and more especially relates to the use of a circuit opening device or sectionalizer in an electric power distribution system in combination with a circuit interrupter which is located in the same system but closer to the source of power supply. More particularly, my invention relates to the use of a circuit opening device in combination with prior art reclosers of the type having one or more instantaneous openings followed by one or more time delayed openings.

In all such distribution systems when a permanent heavy current fault or a short circuit occurs in a branch feeder it is desirable to isolate that particular feeder from the system and permit service on the unaffected feeders to be continued. On the other hand, it is equally undesirable to isolate the feeder in which the fault is located in case the fault is only temporary in nature. Heretofore both fuseless automatic sectionalizing or isolating devices and fuses have been used in cooperation with automatic reclosers to distinguish between such permanent and temporary faults.

However, in order to use fuseless automatic devices and obtain proper coordination with reclosers, prior art has considered it necessary to provide a fuseless isolator or a sectionalizer which counts the number of successive electrical impulses actuating its current responsive means and thus causes the device to open after a predetermined number of such electrical impulses during the momentary period when some other overcurrent protective circuit interrupter in the line, such as an automatic recloser, has interrupted the flow of electrical current. Such sectionalizing fuseless cutouts are exceedingly costly, whereas the service requirements demand the use of a large number of them on a system and the economics dictate a much lower manufacturing cost than it has been possible to obtain with any such devices known to the prior art.

On the other hand, fuses, when utilized in cooperation with reclosers, have presented a relatively inexpensive device. Following the advent of automatic circuit reclosers having one or more instantaneous and one or more time-delay openings, relatively low cost overcurrent protective arrangements have been made by the coordination of reclosers located at spaced points on electrical distribution circuits and at junctions having long branches with fuses located at intermediate points between reclosers and at the shorter branches. The fuse cutouts and fuse links required for such application cost approximately one-fifth of the cost of sectionalizing fuseless cutouts of the existing art which employ an impulse counting means to make possible a similar coordinated setup on distribution circuits.

Notwithstanding their higher cost, however, sectionalizing fuseless cutouts do have definite desirable advantages over the cheaper fuse cutouts. For example, the replacement of fuse links after each operation with the possibility of attendant errors is avoided. The unnecessary interruption caused by the blowing of fuse links by lightning is eliminated. There is also greater simplicity of making a coordinated arrangement of the overcurrent protective devices on an electrical distribution system so that the device furthest from the source of supply and nearest the fault causing excessive current to flow will always function first without causing permanent opening of any overcurrent devices closer to the source of supply.

Nevertheless the differential in cost limits the number of applications of fuseless cutouts which can be justified economically as compared with fuse cutouts and such limited use thus impairs rather than improves the service continuity now possible with fuse-recloser coordinated arrangements.

It is, therefore, an object of my invention to provide a new and improved protective arrangement for power distribution systems.

It is also an object of my invention to obtain greater service continuity in power distribution systems.

It is a further object of my invention to obtain greater service continuity in power distribution systems by using prior art reclosers in combination with a circuit opening device which can be manufactured at a cost more nearly comparable to the cost of fuse cutouts and thereby permit more extensive use of such opening device.

It is another object of my invention to provide a new and improved arrangement of circuit protective devices in electric power distribution systems wherein a prior art recloser is used in combination with a circuit opening device in which the disengagement of its contacts or the opening operation is dependent upon a time-delayed interruption of the recloser.

It is also an object of my invention to provide a new and improved protective arrangement by taking advantage of the time-delayed feature of prior art reclosers in using such reclosers in combination with a circuit opening device in which the opening operation is dependent upon the execution of the time-delayed operation of the recloser.

It is a further object of my invention to provide a new and improved protective system having a recloser used in combination with a circuit opening device in which the contacts are permitted to open only when no current is flowing in the electric circuit wherein they are connected.

As still a further object of my invention it is proposed to provide a new and improved protective arrangement of circuit protective devices by using prior art reclosers in combination with a circuit opening device in which a fault current conditions the device for operation so that the contacts will be opened as soon as the fault current has been interrupted by a recloser.

In accordance with my invention, I provide a new and improved protective arrangement for a power distribution system in which, upon the occurrence of a fault above a predetermined value, the source of power is disconnected one or more times after the fault current has remained above the predetermined value for a relatively short time interval followed by one or more disconnections after the fault current has remained above the predetermined value for a relatively longer time interval by using in the load circuit thereof a circuit opening device in which the circuit opening operation is dependent upon not only the occurrence of the fault above a predetermined value but is also dependent upon the maintenance of the fault on the circuit for a time in excess of the relatively short time interval.

My invention will be better understood from the following description when taken in connection with the accompanying drawing and the scope of my invention will be pointed out in the appended claims. In the drawing, Figure 1 is a schematic diagram of a portion of an electric power distribution system in which the arrangement of my invention is incorporated; Fig. 2 is a side elevation view partly in section of a circuit opening device in the normal closed circuit position which may be used in a distribution system for the fulfillment of my improved protective arrangement; Fig. 3 is a front view of Fig. 2 with the cover or door of the device partly broken away, and Fig. 4 is a detailed view in perspective of an element which, when released, conditions the device for opening.

Referring now to Fig. 1, I have schematically illustrated in a one line diagram part of a distribution system comprising a substation 10 supplying a main feeder 11 and numerous long and short branches as illustrated by branches 12 and 13 through an automatic circuit recloser 14 and automatic circuit opening devices 15 and 16 located in branches 12 and 13 respectively. Automatic recloser 14 may be a relay and a circuit breaker or a unit type interrupter of the types well known to the art having an operating cycle capable of producing one or more complete relatively rapid opening operations followed by reclosing operations of the system circuit in relatively close succession in the event of a sustained fault or overload thereupon. In other words, the openings are more or less instantaneous, that is, with no time delay other than that inherent in the device. Thereafter, if the fault persists, it is adapted to open the circuit one or more additional times but each of these subsequent openings are delayed or occur after the contacts have been closed for a relatively longer period than in the case of the prior instantaneous openings. For the purpose of my invention recloser 14 may initially provide one or more opening operations which are slower than the time delay inherent in the device. That is, it is not necessary that the initial one or more opening operations be instantaneous as long as they are relatively faster than a subsequent opening of the circuit. In fact, insofar as this invention is concerned, my improved protective arrangement is not necessarily limited to the use of any particular device indicated by the numeral 14. The described operation of a relay and circuit breaker or an automatic recloser should be considered only as a means for describing a condition which exists on or a characteristic of electrical distribution circuits in which the source of power, upon the occurrence of a predetermined overcurrent is repeatedly disconnected and reconnected from the load with the initial one or more of the disconnections occurring after a relatively short time interval and with a subsequent disconnection occurring after a relatively longer time interval than the initial disconnections.

For circuit opening devices 15 or 16, I employ a type in which there are a pair of contacts one of which is movable with respect to the other and in which there is a current responsive element which conditions the device for eventual separation of the contacts in the event of a sustained fault or overload in the load circuit. Although the current responsive element reacts or is sensitive to all faults above a predetermined value, the contacts will not be conditioned for separation, however, until recloser 14 has determined by a time delayed operation that the fault is persistent. In other words, the eventual circuit opening operation of circuit opening devices 15 or 16 is dependent, not upon the number of interruptions or openings of recloser 14 but upon existence of the fault on the circuit for a definite period of time as represented in this case by the time equivalent to or slightly less than the delayed time before an interruption of the circuit by recloser 14, but in excess of the time prior to an instantaneous opening of recloser 14. After thus being conditioned, the contacts of opening devices 15 or 16 will separate upon the next interruption of recloser 14. A practical embodiment of circuit opening device 15 or 16 having the aforementioned characteristics is illustrated by Fig. 2 of this application and is fully described and claimed in copending application, Serial Number 761,893 filed concurrently herewith and assigned to the same assignee as this application. Fig. 2, numeral 20 indicates a housing of porcelain or similar insulating material of the size and shape used in connection with the fuse cutouts of the prior art, such as is disclosed, for example, in United States Letters Patent 2,081,813, assigned to the same assignee as the present application. To the rear of the housing or casing 20 is secured a mounting bar 21 for the attachment of the casing to an electric line pole and cross-arm structure or the like. Conductors which are brought into the housing through holes in the housing side wall opposite each of the terminal contacts are adapted to be connected to terminal contacts 22 and 23 by means of binding screws 24 and 25, respectively. Upper contact 22 has a contact finger 26 backed up by means of a spring strip 27 which serves to press the finger 26 downwardly and also has a pair of spaced resilient contact latching fingers 28, only one of which can be seen in the drawings.

A movable door or cover 29 preferably constructed of insulating material is provided for housing 20 and suitably supports a contact support tube 30 and our circuit opening elements to be described hereinafter and generally indicated by the numeral 31. Door support bracket 32 is formed by pending a metallic bar of conducting material at two points equidistant from the midpoint of its predetermined length to form, in plan, an open sided isosceles trapezoid the open side of which is closed by welding or otherwise suitably fixing the two free ends of the trapezoid to a metallic circular cylindrical tube having a length equal to the width of the bars as shown in the drawing and an inside diameter slightly larger than the outside diameter of the contact support tube. This bracket is rigidly fixed to the door by means of screws 33. Contact support tube 30 is of insulating material and is mounted on the cover adjacent its upper end by means of projection 34 of insulating material formed integrally with the cover and provided with an opening for accommodating the tube. The tube is supported adjacent its lower end by insertion into the cylindrical part of the door support bracket and is rigidly held therein by pivot pin 35 which engages an opening in the cylinder and passes through a groove in the wall of the tube perpendicular to its axis.

A metal lever 36 of conducting material supports cover 29 and is bifurcated at its upper end to form a fork, only one arm of which is visible in the drawing. The arms of the fork are pivotally connected to the cylindrical part of the door support bracket by means of pin 35. Lever 36 is provided at its lower end with a hook 37 which passes over a pivotal pin 38 secured in housing 20. Lever 36, prior to the final open circuit position, is electrically connected to the lower contact terminal 23 by means of a contact finger 39 which is pivotally connected between the forks of lever 36 at 40. Contact finger 39 is biased in a clockwise direction to provide the desired contact pressure and also to urge cover 29 and its connected parts to the open position.

Contact cap 41 is threadedly mounted on the upper end of contact support tube 30 and when the door is closed as shown in Figure 2, this cap passes between the resilient contact latching fingers 28 and engages contact finger 26, all of which are electrically connected to upper contact terminal 22.

The circuit opening elements of the circuit opening device, indicated generally as 31, consist of an electro-magnet 42 mounted on its frame 43 which is in turn rigidly mounted on cover 29 by means of screws 44, an armature 45, a latch 46, an arm 47 rigidly fixed to and projecting from hook-shaped lever 36, a cylinder 48 mounted between the arm of cover bracket 32 on the frame of the electro-magnet and a piston 49 with piston rod 50 attached to the armature 45 by pin or screw 51. So as not to impair quick downward motion of armature 45 piston 49 is provided with a check or flapper valve 52 therein. In the head of cylinder 48 is provided small opening 53 and an adjustable screw 54 to vary the area of the opening. One end of the electromagnet winding is electrically connected by flexible conductor 55 to cover support bracket 32 while the other end of the winding is connected to contact cap 41 by flexible conductor 56 which passes up through the contact support tube 30 and is electrically connected by solder or other suitable means to a buttonhead. The buttonhead, of the type conventionally used for fuze links, is fixed in good conducting relationship between the top of the fuze tube 30 and the contact cap when the cap has been screwed down tight on the tube threads. Thus the electromagnet is electrically connected in series relationship with terminals 22 and 23 by way of contact cap 41, conductor 56, conductor 55, cover support bracket 32, pivot pin 35, forked arms of lever 36, pivot pin 40, and contact finger 39. To assure the best conduction between cover support bracket 32 and contact finger 39 these two elements may be interconnected by flexible conductor 57.

From the description thus far and an inspection of the drawing it is obvious that the device as a whole, exclusive of the housing, is pivotally mounted on pan 38 and constitutes a toggle mechanism one arm of which consists of hook-shaped lever 36 and the other arm consists of cover support bracket 32, door 29 and the various elements hereinbefore described and mounted thereon. These two arms are connected at the knee of the toggle by the pin 35. When in the condition shown by Figure 2, the toggle mechanism is in rigid position with movable contact cap 41 and contact finger 39 in electrical engagement with terminals 22 and 23, respectively. These contacts are held in engagement and the toggle maintained in rigid position by the engagement of a projection 58 on latch 46 with an aperture 59 in the projecting arm 47 of hook-shaped lever 36 as better illustrated by Figure 4. Latch 46 is pivotally mounted at 60 on the frame 43 of the electromagnet and is biased by spring 61 in a counterclockwise direction as viewed in Figure 4. However, the biasing actions of contact 26 on contact cap 41, and contact finger 39, urge projecting arm 47 in a counterclockwise direction, as viewed in Figure 2, about pivot pin 38 to maintain the latch and projecting arm in engagement. The winding of the electromagnet is wound on a spool the inside diameter of which is sufficient to accommodate armature 45 for axial movement therein. Piston 49 is prevented from falling by gravity out of its cylinder by the engagement of interconnecting screw or pin 51 with the magnet frame. Armature 45 is provided at the lower end with an enlarged head 62 containing a ledge, or lip 63, thereon.

Under normal current conditions, the door 29, the tube 30 and the circuit opening elements which are pivotally mounted on pin 38 for movement into and out of electrical conducting relation with terminals 22 and 33 will be held so contact cap 41 is in contact with terminal contact 26 and thus with terminal 22 by the engagement of latch 46 with projecting arm 47 and armature 45 will be in the lowermost position of its travel as indicated.

In accordance with my invention, circuit opening device 15 or 16 and recloser 14 are coordinated with each other to the extent that the current responsive element in recloser 14 and the current responsive element in the circuit opening devices are responsive to a current above substantially the same predetermined value. Upon the occurrence of such a predetermined current due to a fault or overload in the load circuit, for example in branch 12, beyond the circuit opening device 15, armature 45 in this circuit opening device will be attracted in an upward direction by magnet 42. However, the upward travel of the armature will be retarded or delayed by the piston which must remove practically all of the air through the relatively small opening 53 before the armature can reach the limit of its upward travel. Nevertheless, it will be attracted and start to move upward and at the same time the current responsive element in recloser 14 will operate to first open and then reclose its contacts one or more times in rapid succession. Obviously, each time the recloser thus interrupts the circuit, current responsive element 42 in circuit opening device 15 will be deenergized so that armature 45 will fall by gravity in a downward direction. The dropping of the armature will, of course, be relatively rapid since flapper valve 52 will open on the downward stroke and thereby permit escape of air trapped under the piston into the cylinder space above the piston. Further coordination between circuit opening device 15 and recloser 14 is employed by my invention in that the area of opening 53 in the head of cylinder 48 is chosen or adjusted so that armature 45 will never move appreciably in an upward direction before the fault current has been interrupted by the recloser during its one or more relatively rapid, or instantaneous openings. On the other hand, however, the circuit opening device is coordinated with the recloser or the area of opening is adjusted so that the period of time involved prior to a delayed opening of the recloser will be sufficient to permit the armature to rise to the extent that lip 63 on the head 62 will raise the free end of projecting arm 47 which is in the path of travel of the lip whereupon the aperture 59 in the arm will be disengaged from projection 58 thereby releasing latch 43 for counterclockwise movement under biasing action of spring 61. It will be apparent that the circuit opening device is now in condition for separation of its contacts inasmuch as the latch which thus far has been effective to hold them in engagement has been released. However, the contacts will nevertheless be held in engagement by the lip 63 of armature 45 or, in effect, by the fault current itself prior to actual interruption of the circuit by recloser 14 whereupon the electromagnet 42 will be deenergized sufficiently to allow a relatively quick downward movement of armature 45, the freeing of projecting arm 47 for counterclockwise movement about pin 38, collapse of the toggle mechanism and disengagement of the contacts. Inasmuch as the fault or overload in the load circuit will thus be isolated by the circuit opening device during the momentary period recloser 14 is open following the relatively long period of closure, service will be restored on the remainder of the circuit following the next reclosing of the automatic recloser 14.

While I have, in accordance with the patent statutes, shown and described a combination of particular devices which by their inter-cooperation provide my new and improved protective arrangement for electric power distribution systems, I do not desire my invention to be limited to the use of the particular devices described. It will of course, be evident to those skilled in the art that other devices and modifications of those described may be used in such system without departing from my invention. For example, a circuit opening device may be employed in which an armature moves its complete travel against the retarding force of a time delay element but does not trip a latch until after a recloser has interrupted the circuit after which the armature in returning to the deenergized position trips the latch causing the device to open. Devices in which electro-responsive means other than a magnet, various time delay means such as a spring, flywheel, gear train with escapement elements and various arrangements of latches and levers are utilized may also be employed so long as the device is not conditioned for operation until after the expiration of a predetermined period of time determined by the time involved between a delayed interruption and the immediately preceding interruption of an automatic recloser. I therefore aim in the appended claims to cover all changes and modifications as fall within the true spirit and scope of my invention.

What I claim as new and desire to secure by Letters Patent of the United States is:

1. A protective arrangement for a load circuit supplied from a source of current comprising the combination of an automatic circuit interrupter for repeatedly disconnecting and reconnecting the load circuit from and to the source upon the occurrence of a persistent fault on the load circuit, said interrupter including means for first effecting a predetermined number of disconnections of the load circuit in response to the current in the load circuit exceeding a predetermined value for a predetermined time and then effecting the next disconnection of the load circuit in response to the current in the load circuit exceeding said predetermined value for a predetermined longer time than said first mentioned predetermined time, and a circuit opening device comprising a pair of cooperating contacts connected in said load circuit, means biasing one of said contacts out of engagement with the other contact, holding means including a releasable latch to hold such contacts in engagement, means including time delay means operable in response to the current in the load circuit through said contacts first exceeding said first-mentioned predetermined value for a longer time than said first mentioned time to release such latch and then operable in response to said current decreasing below a predetermined value to permit disengagement of said contacts and disconnection of a portion of the load circuit from the source.

2. A protective arrangement for an electric circuit comprising the combination of an automatic reclosing circuit interrupter operative in response to a current in excess of a predetermined value to interrupt said circuit a predetermined number of times at least one of said interruptions being substantially instantaneous and a subsequent interruption being delayed, and a circuit opening device comprising holding means including a releasable latch for maintaining said device closed and means including time delay means responsive to said predetermined current only during said subsequent delayed interruption of said reclosing circuit interrupter to release said latch and operative independently of said latch to maintain said circuit device in closed position until said delayed interruption.

3. A protective arrangement for an electric circuit comprising the combination of an automatic reclosing circuit interrupter operative in response to a current in excess of a predetermined value to interrupt said circuit a predetermined number of times at least one of said interruptions being substantially instantaneous and a subsequent interruption being delayed, and a circuit opening device comprising holding means including a releasable latch for maintaining said device closed and means including time delay means responsive to said predetermined current only during said subsequent delayed interruption of said reclosing circuit interrupter to release said latch and permit opening of said circuit opening device upon the occurrence of a subsequent interruption of the circuit.

4. A protective arrangement for a load circuit supplied from a source of current comprising means responsive to current above a predetermined value for repeatedly disconnecting and reconnecting the load circuit from and to the source in relatively quick succession upon the occurrence of a persistent fault on the load circuit with the initial one or more of said disconnections occurring after the fault current has remained above said predetermined value for a time of relatively short duration followed by a subsequent disconnection after the fault current has remained above said predetermined value for a time of relatively long duration and a circuit opening device comprising holding means including a releasable latch for maintaining said device closed and means including time delay means responsive only to a predetermined current value which persists relatively longer than that causing said initial one or more disconnections for releasing said latch and for opening said circuit opening device and said load circuit upon the occurrence of a subsequent interruption of the circuit.

5. A protective arrangement for a load circuit supplied from a source of current comprising means responsive to current above a predetermined value for repeatedly disconnecting and reconnecting the load circuit from and to the source in relatively quick succession upon the occurrence of a persistent fault on the load circuit with the initial one or more of said disconnections occurring after the fault current has remained above said predetermined value for a time of relatively short duration followed by a subsequent disconnection after the fault current has remained above said predetermined value for a time of relatively long duration and a circuit opening device comprising a pair of cooperating contacts, holding means including a releasable latch for holding said contacts in engagement, means operable in response to the current through said contacts exceeding said predetermined value to release said latch and to hold said contacts in engagement until the current through said contacts subsequently decreases below a predetermined value, time delay means operable to delay said current operable means from rendering said holding means ineffectual until the current continues above said predetermined value for a time in excess of said relatively short duration but equal to or less than said relatively long duration, and means for moving one of said contacts out of engagement with the other when said current operable means is no longer effective to hold said contacts in engagement.

6. A protective arrangement for a load circuit supplied from a source of current comprising means responsive to current above a predetermined value for repeatedly disconnecting and reconnecting the load circuit from and to the source in relatively quick succession upon the occurrence of a persistent fault on the load circuit with the initial one or more of said disconnections occurring after the fault current has remained above said predetermined value for a time of relatively short duration followed by a subsequent disconnection after the fault current has remained above said predetermined value for a time of relatively long duration and a circuit opening device comprising a pair of cooperating contacts, holding means including a releasable latch for holding said contacts in engagement, means including time delay means operable in response to the current through said contacts exceeding said predetermined value only during said time of relatively long duration to release said latch and to hold said contacts in engagement until the current through said contacts subsequently decreases below a predetermined value.

7. A protective arrangement for an electrical distribution circuit in which the source of power, upon occurrence of a current above a predetermined value is repeatedly disconnected and reconnected from the load with the initial one or more of the disconnections occurring after a relatively short time interval and with a subsequent disconnection occurring after a relatively longer time interval than the initial disconnections and in which a portion of said circuit is connected through a circuit opening device comprising holding means including a releasable latch for maintaining said device closed and means including time delay means responsive only to a predetermined current value flowing through said device which persists longer than that causing said one or more disconnections of said source of power from said load occurring after a relatively short time interval but shorter than said subsequent disconnection occurring after a relatively longer time interval to release said latch and to permit opening of said circuit opening device and said circuit upon the occurrence of said subsequent disconnection.

GEORGE F. LINCKS.

REFERENCES CITED

The following references are of record in the file of this patent:

UNITED STATES PATENTS

| Number | Name | Date |
|---|---|---|
| 1,105,392 | Wright | July 28, 1914 |
| 1,371,561 | James | Mar. 15, 1921 |
| 1,982,986 | Garlington | Dec. 4, 1934 |
| 2,152,445 | Shoemaker et al. | Mar. 28, 1939 |
| 2,337,713 | Garlington | Dec. 28, 1943 |
| 2,387,372 | Watkins | Oct. 23, 1945 |
| 2,387,373 | Watkins | Oct. 23, 1945 |
| 2,405,606 | Rawlins et al. | Aug. 13, 1946 |
| 2,414,786 | Lincks et al. | Jan. 21, 1947 |
| 2,468,851 | Wallace | May 3, 1949 |

FOREIGN PATENTS

| Number | Country | Date |
|---|---|---|
| 360,057 | Great Britain | Nov. 5, 1931 |